United States Patent
Noritake et al.

(10) Patent No.: US 11,906,059 B2
(45) Date of Patent: Feb. 20, 2024

(54) GAS GOVERNOR

(71) Applicant: RINNAI CORPORATION, Aichi (JP)

(72) Inventors: Katsuya Noritake, Aichi (JP); Kotaro Kuzuya, Aichi (JP)

(73) Assignee: RINNAI CORPORATION, Aichi (JP)

( * ) Notice: Subject to any disclaimer, the term of this patent is extended or adjusted under 35 U.S.C. 154(b) by 0 days.

(21) Appl. No.: 18/155,220

(22) Filed: Jan. 17, 2023

(65) Prior Publication Data

US 2023/0323968 A1  Oct. 12, 2023

(30) Foreign Application Priority Data

Apr. 11, 2022  (JP) ................................. 2022-064996

(51) Int. Cl.
*F16K 41/12* (2006.01)
*F16K 15/06* (2006.01)
*F16K 15/18* (2006.01)

(52) U.S. Cl.
CPC ............. *F16K 15/06* (2013.01); *F16K 41/12* (2013.01); *F16K 15/182* (2021.08)

(58) Field of Classification Search
CPC ...... F23N 1/005; F23N 1/007; F23N 2235/14; F23N 2235/16; F23N 2235/20; F23N 2235/24; F23K 5/002; F23K 5/007; F23K 2203/104; F23K 2400/201; G05D 16/024; G05D 16/2022; G05D 16/2095; F16K 31/0655; F16K 31/0672; F16K 31/1266; F16K 41/103; F16K 41/12
See application file for complete search history.

(56) References Cited

U.S. PATENT DOCUMENTS 7,347,221 B2 *  3/2008  Berger ................ F16K 31/0655
335/265

FOREIGN PATENT DOCUMENTS

| JP | S61149675 | A | * | 7/1986 |
| JP | S61157779 | U | * | 9/1986 |
| JP | H0337489  | A | * | 2/1991 |
| JP | 06-159654 | A |   | 6/1994 |
| JP | 2017026220 | A | * | 2/2017 |

* cited by examiner

*Primary Examiner* — Hailey K. Do
(74) *Attorney, Agent, or Firm* — Cermak Nakajima & McGowan LLP; Tomoko Nakajima

(57) ABSTRACT

Not only a cylindrical weight is inserted with a clearance around an outside of a first axis part or a second axis part that extends opposite to the first axis part and is movable freely in an axial direction but also an annular seat surface on which the cylindrical weight is able to be seated by self-weight is provided with a governor valve. A projecting part(s) is provided with only a part in circumferential direction of one of the annular seat surface and a lower end surface of the cylindrical weight. The cylindrical weight is made sure to be supported on the annular seat surface in an inclined state from an upright posture by contact of the projecting part(s) with the other of the annular seat surface and the lower end surface of the cylindrical weight.

4 Claims, 4 Drawing Sheets

GAS GOVERNOR

TECHNICAL FIELD

The invention relates to a gas governor that is interposed in a gas supply passage to a gas burner.

Background Art

Originally, with this kind of the governor, a casing that has a primary pressure chamber, a secondary pressure chamber above or below the primary pressure chamber, and a valve seat between the primary pressure chamber and the secondary pressure chamber, a diaphragm that faces to the primary pressure chamber at an opposite side of the valve seat, and a governor valve that is inserted into a valve hole which is formed at the valve seat and has a valve body part with a diameter which is enlarged in sequence toward an end part at a side of the secondary pressure chamber are provided. In the gas governor, a first axis part of the governor valve, which extends from the valve body part to a side of the diaphragm, is connected to the diaphragm. By displacing the governor valve through the diaphragm depending on gas pressure fluctuation in the first primary pressure chamber, gas pressure fluctuation in the secondary pressure chamber is configured to be suppressed.

Incidentally, in the above-mentioned gas governor, exterior impact and something else trigger off oscillation of the governor valve so that the valve body part collides with the valve seat, as a result, a noise, i.e., so-called governor sound, sometimes occurs. Then, there has been conventionally known the gas governor in which a cylindrical weight is inserted with a clearance around an outside of a second axis part which extends from the valve body part to an opposite side of the diaphragm, or the first axis part, and is movable freely in an axial direction is arranged, and, in addition, an annular seat surface on which the cylindrical weight is able to be seated by self-weight is arranged at the governor valve (See Patent document No. 1, for example). According to this, oscillation in an axial direction of the governor valve is damped by antiphase oscillation in the axial direction of the cylindrical weight and the governor sound can be suppressed to some extent.

However, it was found that a cause of the governor sound was not only the oscillation in the axial direction of the governor valve but also oscillation (lateral swing) in a radial direction of the governor valve, in which a connecting portion to the diaphragm serves as a fulcrum. The conventional gas governor cannot damp the oscillation in the radial direction of the governor valve and the governor sound has not been sufficiently suppressed.

REFERENCE

Patent document No. 1: JPA 1994-159654

SUMMARY OF INVENTION

Technical Problem

In the light of the above-mentioned problem, the invention provides a gas governor that can effectively suppress the governor sound by possibly damping the oscillation not only in the axial direction but also in the radial direction of the governor valve.

Solution to Problem

In order to solve the above-mentioned problem, the invention presupposes a gas governor that includes, a casing that has a primary pressure chamber, a secondary pressure chamber above or below the primary chamber, and a valve seat between the primary pressure chamber and the second pressure chamber; a diaphragm that faces to the first pressure chamber at an opposite side of the valve seat; and a governor valve that has a valve body part with a diameter which is enlarged in sequence toward an end part at a side of the secondary pressure chamber, wherein a first axis part of the governor valve, which extends from the valve body part to a side of the diaphragm, is connected to the diaphragm, and by displacing the governor valve through the diaphragm depending on gas pressure fluctuation in the primary pressure chamber, gas pressure fluctuation in the secondary pressure chamber is suppressed. The gas governor further includes a cylindrical weight that is inserted with a clearance around an outside of a second axis part of the governor valve, which extends from the valve body part to an opposite side of the diaphragm, or the first axis part, and is movable freely in an axial direction, and an annular seat surface on which the cylindrical weight is able to be seated by self-weight. In the gas governor, a projecting part(s) is provided with only a part in a circumferential direction of one of the annular seat surface and a lower end surface of the cylindrical weight, and by contact of the projecting part(s) with the other of the annular seat surface and the lower end surface of the cylindrical weight, the cylindrical weight is supported on the annular surface in an inclined state from an upright posture.

According to the invention, a lower end of the cylindrical weight becomes away from the annular seat surface between the projecting part(s) and a contact part(s) that comes into contact with the annular seat surface at an opposite side in the circumferential direction of the projecting part(s). Therefore, the cylindrical weight becomes unstable and easily swings in a radial direction. As a result, not only oscillation in an axial direction of the governor valve can be damped by antiphase oscillation in the axial direction of the cylindrical weight but also oscillation in a radial direction of the governor valve can be damped by antiphase oscillation in the radial direction of the cylindrical weight. Accordingly, so-called governor sound can be effectively suppressed.

Meanwhile, in a case where the number of the projecting part(s) is only one, the cylindrical weight may be excessively unstable and even at usual time when the governor sound does not occur, it is likely that the cylindrical weight swings in the radial direction and there is possibility that gas pressure in the secondary pressure chamber becomes unstable. Accordingly, in the invention, it is desirable that, with the part in the circumferential direction of the one of the annular seat surface and the lower end surface of the cylindrical weight, a plurality of the projecting parts that are disposed at a distance in the circumferential direction are provided and a central angle of a width in the circumferential direction between contact parts of two of the projecting parts, one of which is disposed at one side in the circumferential direction and the other of which is disposed at the other side, with the other of the annular seat surface and the lower end surface of the cylindrical weight is set within a range from 30° to 60°. According to this, as below-mentioned, the cylindrical weight can be supported in an appropriately unstable state so that though in a state where the governor sound occurs, the cylindrical weight swings in the radial direction, at the usual time, the cylindrical weight does not swing in the radial direction.

Additionally, in the invention, it is desirable that, in a case where the projecting part(s) is provided with the annular seat surface, the projecting part(s) is provided to extend from an inner circumferential edge to an outer circumferential edge of the annular seat surface. According to this, if a position of the cylindrical weight deviates in the radial direction, the lower end of the cylindrical weight is avoided coming off the projecting part(s) and a damping effect of the oscillation in the radial direction of the governor valve can be surely obtained.

DESCRIPTION OF EMBODIMENTS

Figure 1:
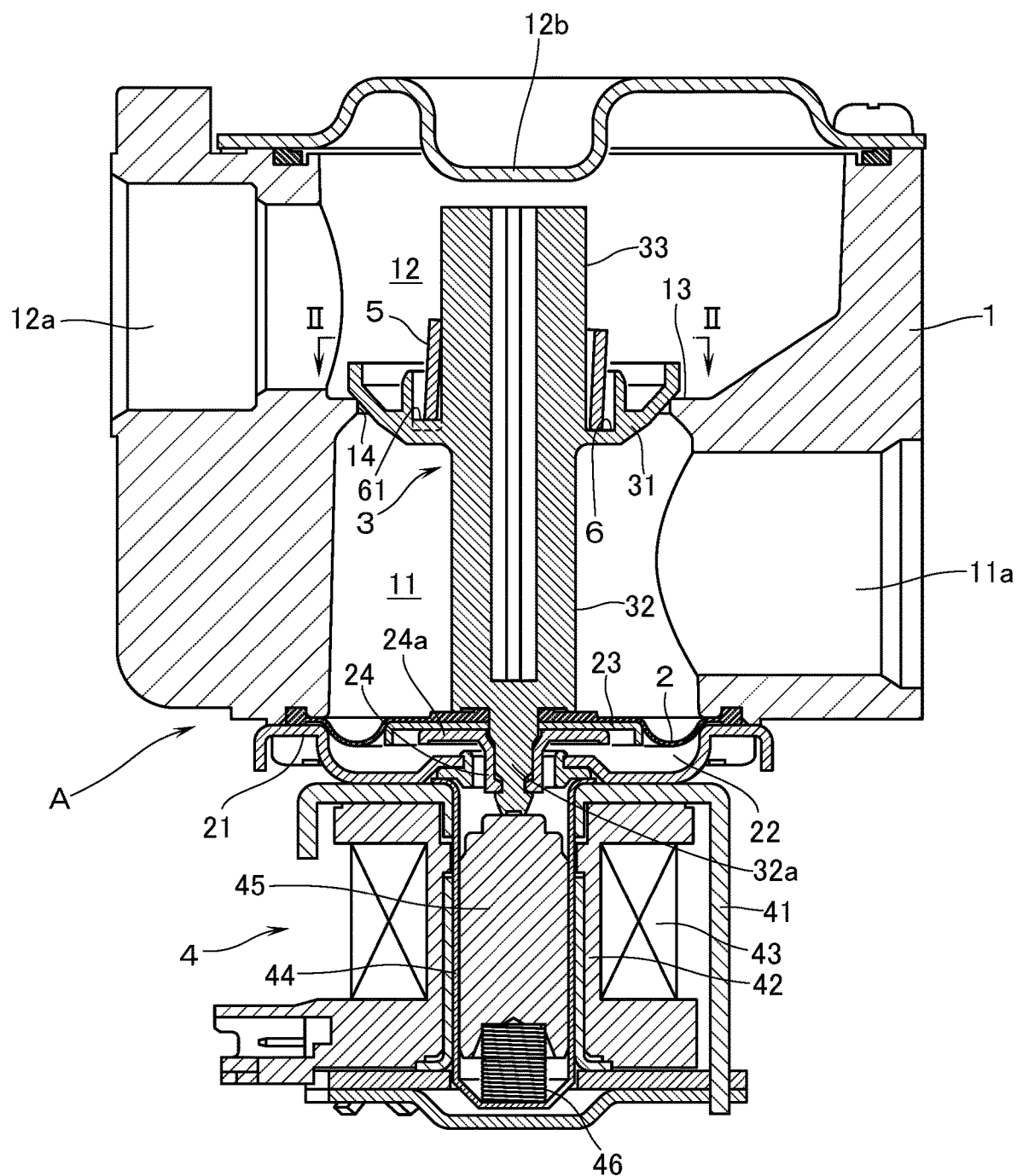
FIG. 1 is a sectional view of a proportional valve apparatus with a governor, which is constituted by using a gas governor of a first embodiment of the invention.

Referring to FIG. 1, A represents a proportional valve apparatus with a governor, which is constituted by a gas governor of an embodiment of the invention and is interposed in a gas supply passage to a gas burner. The proportional valve apparatus A includes a casing 1 that has a first pressure chamber 11 which communicates with a gas inlet 11a, a secondary pressure chamber 12 which is positioned above the primary pressure chamber 11 and communicates with a gas outlet 12a, and a valve seat 13 between the primary pressure chamber 11 and the secondary pressure chamber 12. At the valve seat 13, a valve hole 14 that interconnects the primary pressure chamber 11 to the second pressure chamber is formed.

Additionally, the proportional valve apparatus A includes a diaphragm 2 that faces to the primary pressure chamber 11 at an opposite side of the valve seat 13, i.e., at a lower side, a governor valve 3 that is connected to the diaphragm 2, and an electromagnetic solenoid 4 that presses the governor valve 3 upward, i.e., to an opening side. An outer circumferential part of the diaphragm 2 is sandwichedly fixed to an outer circumferential part of a lower surface of the primary pressure chamber 11 by a keep plate 21 that is fastened to a lower surface of the casing 1. Thus, between the diaphragm 2 and the keep plate 21, a back pressure chamber 22 that is opened to atmosphere is configured to be partitioned. Additionally, at a lower side of the diaphragm 2, a cylindrical valve holder 24 that has a flange part 24a at upper end, which comes into contact with a lower surface of the diaphragm 2 through a washer 23.

The governor valve 3 has an umbrella-shaped valve body part 31, which is inserted into the valve hole 14, with a diameter that is enlarged in sequence toward an end part of a side of the secondary pressure chamber 12, i.e., an upper end part, and a first axis part 32 that downwardly extends from the valve body part 31 and is connected to the diaphragm 2. At a lower end part of the first axis part 32, a small-diameter axis part 32a is downwardly projected from a shoulder surface that comes into contact with an upper surface of the diaphragm 2. By fitting and fixing the small-diameter axis part 32a to the valve holder 24 through a hole that is formed at a center of the diaphragm 2, the governor valve 3 is connected to the diaphragm 2. Meanwhile, with the governor valve 3, a second axis part 33 that extends from the valve body part 31 toward an opposite side of the diaphragm 2, i.e., upwardly is provided. A stroke in an opening direction of the governor valve 3 is configured to be regulated by contact of the second axis part 33 with a lid plate 12b that covers an upper surface of the secondary pressure chamber 12.

The electromagnetic solenoid 4 has a yoke 41 that is attached to a lower surface of the keep plate 21, a coil 43 that is wound around a bobbin 42 in the yoke 41, a plunger 45 that is slidably, in a vertical direction, inserted into a cylindrical guide 44 at an inner circumference of the yoke 41, and a spring 46 that cancels self-weight of the plunger 45 by upwardly urging the plunger 45. The plunger 45 comes into contact with a lower end of the small-diameter axis part 32a of the governor valve 3 and presses the governor valve 3 upwardly, i.e., to the opening side by pressing force in proportion to an energizing current value to the coil 43. As the current value is increased, the governor valve 3 displaces to the opening side, a clearance (opening degree) between a circumferential surface of the valve hole 14 and the valve body part 31 is enlarged and gas pressure in the secondary pressure chamber 12 increases. Accordingly, a supplying gas amount to the gas burner varies in proportion to the current value. Additionally, when gas pressure in the primary gas pressure fluctuates, the governor valve 3 displaces through the diaphragm 2, the opening degree changes so as to absorb the gas pressure fluctuation, and gas pressure fluctuation in the secondary pressure chamber 12 is suppressed. Therefore, even if the gas pressure fluctuation in the primary pressure chamber 11 occurs, the gas pressure in the secondary pressure chamber 12 is maintained at a predetermined pressure depending on the current value.

Incidentally, exterior impact and something else trigger off occurrence of oscillation in an axial direction (vertical direction) of the governor valve 3 and oscillation in a radial direction (lateral swing) of the governor valve 3, in which a connecting portion to the diaphragm 2 serves as a fulcrum so that the valve body part 31 collides with the valve seat 13, as a result, so-called governor sound, sometimes takes place. Then, in order to suppress the governor sound, a cylindrical weight 5 that is inserted with a clearance around an outside of the second axis part 33 of the governor valve 3 and is movable freely in an axial direction is provided. Additionally, with the governor valve 3, an upward annular seat surface 6 on which the cylindrical weight 5 is able to be seated by self-weight is provided. In the embodiment, the annular seat surface 6 is provided with the valve body part 31 of the governor valve 3.

A projecting part(s) 61 is provided with only a part in a circumferential direction of the annular seat surface 6. By contact of the projecting part(s) 61 with a lower end surface of the cylindrical weight 5, the cylindrical weight 5 is configured to be supported on the annual seat surface 6 in a state where the cylindrical weight 5 is inclined from an upright posture. Therefore, a lower end of the cylindrical weight 5 becomes away from the annular seat surface 6 between the projecting part(s) 61 and a contact part(s) that comes into contact with the annular seat surface 6 at an opposite side in the circumferential direction of the projecting part(s) 61. As a result, the cylindrical weight 5 becomes unstable and easily swings in the radial direction.

According to this, not only oscillation in the axial direction of the governor valve 3 can be damped by antiphase oscillation in the axial direction of the cylindrical weight 5 but also oscillation in the radial direction of the governor valve 3 can be damped by antiphase oscillation in the radial direction of the cylindrical weight 5. Therefore, the governor sound can be effectively suppressed.

Meanwhile, the projecting part(s) 61 is provided to extend from an inner circumferential edge to an outer circumferential edge of the annular seat surface 6. Therefore, if the cylindrical weight 5 deviates in the radial direction, the lower end of the cylindrical weight 5 is avoided coming off the projecting part(s) 61. Accordingly, damping effect of the oscillation in the radial direction of the governor valve 3 can be surely obtained. In the embodiment, though the projecting part(s) 61 extends in the radial direction from the inner circumferential part to the outer circumferential part of the annular seat surface 6, an extending direction of the projecting part(s) 61 may be an intersecting direction to the radial direction.

Figure 2:
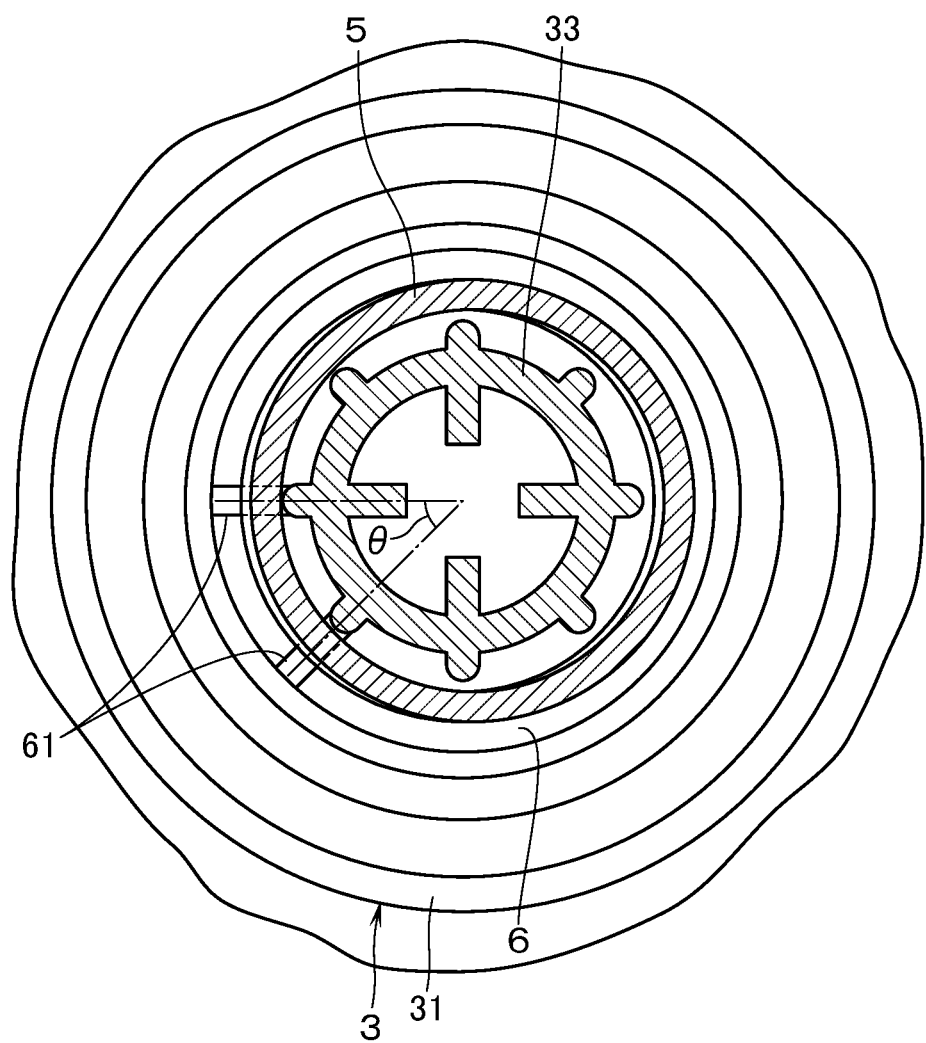
FIG. 2 is an enlarged plan view that is cut off along a II-II line of FIG. 1.

Additionally, in a case where the number of the projecting part(s) 61 is only one, the cylindrical weight 5 may be excessively unstable and even at usual time when the governor sound does not occur, it is likely that the cylindrical weight 5 swings in the radial direction and there is possibility that gas pressure in the secondary pressure chamber 12 becomes unstable. Then, in the embodiment, as shown in FIG. 2, with a part in the circumferential direction of the annular seat surface 6, two of the projecting parts 61, 61 that are disposed at a distance in the circumferential direction are provided. Further, a central angle θ of a width in the circumferential direction between contact parts of both of the projecting parts 61, 61 with the lower end surface of the cylindrical weight 5, i.e., between top parts of both of the projecting parts 61, 61 is configured to become 45°. Here, it should be noted that, if the central angle θ of the width in the circumferential direction between the top parts of both of the projecting part 61, 61 is beyond 60°, the cylindrical weight 5 becomes stable and when the governor sound occurs, the cylindrical weight 5 does not swing well in the radial direction. On the other hand, if the central angle θ of the width in the circumferential direction between the top parts of both of the projecting part 61, 61 becomes less than 30°, there is no remarkable difference in a case where the number of the projecting part(s) 61 is only one and even at a usual time when the governor sound does not occur, the cylindrical weight 5 is apt to swing in the radial direction. Accordingly, in order that the cylindrical weight 5 is supported in an appropriately unstable state so that though in the state where the governor sound occurs, the cylindrical weight 5 swings in the radial direction, at the usual time, the cylindrical weight 5 does not swing in the radial direction, the central angle θ of the width in the circumferential direction between the top parts of both of the projecting part 61, 61 should be set within a range from 30° to 60°.

Figure 3:
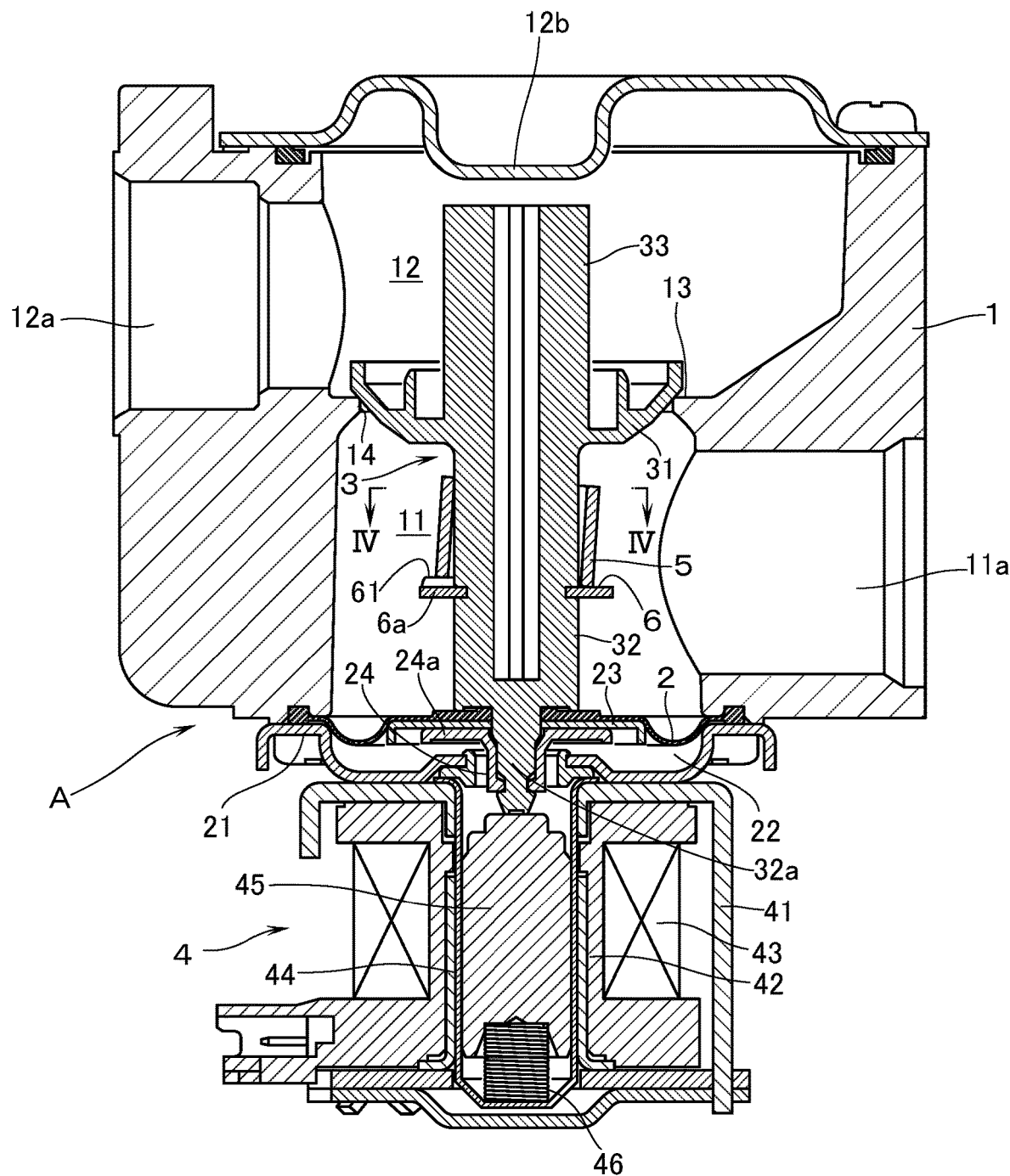
FIG. 3 is a sectional view of a proportional valve apparatus with a governor, which is constituted by using a gas governor of a second embodiment of the invention.
Figure 4:
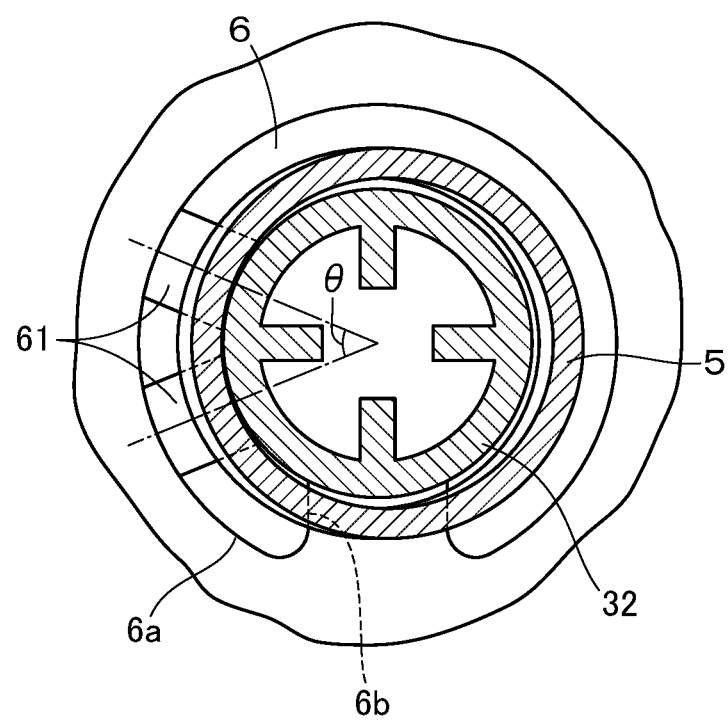
FIG. 4 is an enlarged plan view that is cut off along a IV-IV line of FIG. 3.

Next, a second embodiment that is shown in FIGS. 3, 4 will be explained. A basic structure of the second embodiment is not particularly different from that of the first embodiment and the same symbols as above-denoted are marked similar members and parts to those in the first embodiment. Difference of the second embodiment from the first embodiment is as follows: one is that the axis part into which the cylindrical weight is inserted into the outside is changed to the first axis part 32, and the other is that a snap ring 6a is mounted on an outer surface of the first axis part 32 at a lower side of the cylindrical weight 5 and the annular seat surface 6 is constituted by an upper surface of a part of the snap ring 6a, which protrudes outward from an outer circumferential surface of the first axis part 32.

With a part in a circumferential direction of the upper surface of the snap ring 6a as the annular seat surface 6, two of the projecting parts 61, 61 that are disposed at a distance in the circumferential direction are provided. The central angle θ of the width in the circumferential direction between the contact parts of both of the projecting parts 61, 61 with the lower end surface of the cylindrical weight 5, i.e., between the top parts of both of the projecting parts 61, 61 is configured to become 45°. Therefore, as is similar to the first embodiment, the cylindrical weight 5 can be supported in the appropriate unstable state so that though in the state where the governor sound occurs, the cylindrical weight swings in the radial direction, at the usual time, the cylindrical weight 5 does not swing in the radial direction.

Meanwhile, each projecting part 61 is formed by performing press work for the part of the snap ring 6a that protrudes outward from the outer circumferential surface of the first axis part 32 so that a sectional shape along the circumferential direction is upwardly curved in an arch shape. Further, each projecting part 61 extends from the inner circumferential edge to the outer circumferential edge of the annular seat surface 6 that is the upper surface of the part of the snap ring 6a, which protrudes outward from the circumferential surface of the first axis part 32. Therefore, as is similar to the first embodiment, if the cylindrical weight 5 deviates in the radial direction, the lower end of the cylindrical weight 5 is avoided coming off each projecting part 61. Meanwhile, at one part in the circumferential direction of the snap ring 6a, a notch 6b is formed.

The embodiments of the invention are explained referring to figures in the above. On the other hand, the invention is not restricted to the above-mentioned embodiments. For example, though, in the above-mentioned embodiments, two of the projecting parts 61 that are provided with a part in the circumferential direction of the annular seat surface 6, three or more of the projecting parts may be provided. In this case, the central angle of the width in the circumferential direction between the contact parts of two of the projecting parts 61, 61 in a plurality of the projecting parts, one of which is disposed at one side in the circumferential direction and the other of which id disposed at the other side, with the lower end surface of the cylindrical weight 5 should be set within the range from 30° to 60°. Meanwhile, in the above-mentioned embodiments, two of the projecting parts 61, 61 are two of the projecting parts one of which is disposed at one side in the circumferential direction and the other of which is disposed at the other side.

Additionally, the projecting part(s) is provided with a part of the lower end surface in the circumferential of the cylindrical weight 5 and by contact of the projecting part(s) with the annular surface 6, the cylindrical weight 5 may be configured to be supported in an inclined state from the upright posture on the annular seat surface 6. Further, though, in the above-mentioned embodiments, the secondary pressure chamber 12 is disposed above the primary pressure chamber 11, it is possible that the secondary pressure chamber 12 is disposed below the primary pressure chamber 11. In this case, the casing 1 and the governor valve 3 are disposed upside down in a differential manner of those which are shown in FIGS. 1, 3. Therefore, the cylindrical weight 5 may be inserted with a clearance into an outside around the first axis part 32 that upwardly extends from the valve body 31 of the governor valve 3 and the annular surface 6 may be constituted by the upper surface of the valve body part 31. Otherwise, the cylindrical weight 5 may be inserted with a clearance into an outside around the second axis part 33 that downwardly extends from the valve body part 31 and the annular seat surface 6 may be constituted by the upper surface of the snap ring 6a that is mounted on the outer surface of the second axis part 33. Additionally, though the above-mentioned embodiments are the ones which the invention is applied to the gas governor that constitutes the proportional valve apparatus with the governor, with which the electromagnetic solenoid 4 is provided, the invention is similarly applicable to a usual gas governor without the electromagnetic solenoid 4.

EXPLANATION OF SYMBOLS

1 Casing
11 Primary pressure chamber
12 Secondary pressure chamber
13 Valve seat
14 Valve hole
2 Diaphragm
3 Governor valve
31 Valve body part
32 First axis part
33 Second axis part
5 Cylindrical weight
6 Annular seat surface
61 Projecting part(s)

What is claimed is:

1. A gas governor comprising,
a casing that has a primary pressure chamber, a secondary pressure chamber above or below the primary chamber, and a valve seat which is disposed between the primary pressure chamber and the second pressure chamber;
a diaphragm that faces to the primary pressure chamber at an opposite side of the valve seat; and
a governor valve that has a valve body part with a diameter which is enlarged in sequence toward an end part at a side of the secondary pressure chamber,
wherein a first axis part of the governor valve, which extends from the valve body part to a side of the diaphragm, is connected to the diaphragm, and by displacing the governor valve through the diaphragm depending on gas pressure fluctuation in the primary pressure chamber, gas pressure fluctuation in the secondary pressure chamber is suppressed and wherein the gas governor further comprises a cylindrical weight that is inserted with a clearance around an outside of a second axis part of the governor valve, which extends from the valve body part to an opposite side of the diaphragm, or the first axis part, and is movable freely in an axial direction, and an annular seat surface on which the cylindrical weight is able to be seated by self-weight,
wherein:
a projecting part(s) is provided with only a part in a circumferential direction of one of the annular seat surface and a lower end surface of the cylindrical weight, and by contact of the projecting part(s) with the other of the annular seat surface and the lower end surface of the cylindrical weight, the cylindrical weight is supported on the annular seat surface in an inclined state from an upright posture.

2. The gas governor as claimed in claim 1, wherein the projecting part(s) is provided with the annular seat surface,
wherein the projecting part(s) is provided to extend from an inner circumferential edge to an outer circumferential edge of the annular seat surface.

3. The gas governor as claimed in claim 1, wherein, with the part in the circumferential direction of the one of the annular seat surface and the lower surface of the cylindrical weight, a plurality of the projecting parts that are disposed at a distance in the circumferential direction are provided and a central angle of a width in the circumferential direction between contact parts of two of the projecting parts, one of which is disposed at one side in the circumferential direction and the other of which is disposed at the other side, with the other of the annular seat surface and the lower end surface of the cylindrical weight is set within a range from 30° to 60°.

4. The gas governor as claimed in claim 3, wherein the projecting part(s) is provided with the annular seat surface,
Wherein the projecting part(s) is provided to extend from an inner circumferential edge to an outer circumferential edge of the annular seat surface.

* * * * *